Figure 1:
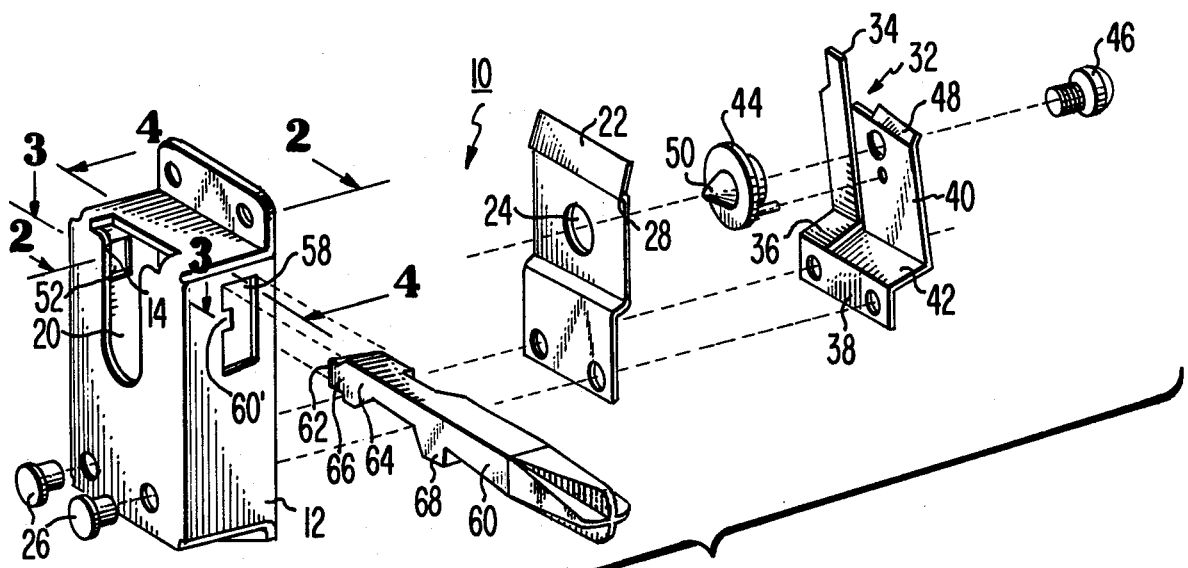

United States Patent [19]

Kongelka et al.

[11] 4,151,467
[45] Apr. 24, 1979

[54] SWITCHED MICROPHONE HANG-UP BRACKET

[75] Inventors: Robert M. Kongelka, Washington; Paul L. Buess, Pittsburgh, both of Pa.

[73] Assignee: RCA Corporation, New York, N.Y.

[21] Appl. No.: 733,301

[22] Filed: Oct. 18, 1976

[51] Int. Cl.² .................. H04B 1/38; H04M 11/00; H01H 3/16
[52] U.S. Cl. ................................. 325/15; 200/329; 179/100 R
[58] Field of Search ............. 325/15, 16, 466, 21, 325/310, 312, 313, 102, 117, 119, 66; 179/1 HS, 2 B, 167, 159, 100 R, 100 L; 200/329, 330

[56] References Cited

U.S. PATENT DOCUMENTS

| 2,485,574 | 10/1949 | Deakin | 179/167 |
|---|---|---|---|
| 3,243,565 | 3/1966 | Sutton | 200/330 |
| 3,396,244 | 8/1968 | Kowaleski | 179/100 R |
| 3,406,263 | 10/1968 | Klenk | 179/100 R |
| 3,712,965 | 1/1973 | Dalton | 200/330 |
| 3,868,571 | 2/1975 | Greiner | 325/15 |
| 4,041,390 | 8/1977 | Schroeder | 325/21 |

*Primary Examiner*—Benedict V. Safourek
*Assistant Examiner*—Tommy P. Chin
*Attorney, Agent, or Firm*—Eugene M. Whitacre; Paul J. Rasmussen; Robert L. Troike

[57] ABSTRACT

A switched microphone hang-up bracket includes an outer case for receiving a microphone which is releasably secured thereto. The microphone is of the type which may be used in a mobile two-way radio system having a continuous tone coded squelch system (CTCSS) disable switch. The bracket includes a camming device for mechanically placing the switch in either the enable or disable mode to selectively place the receiver in a "noise squelch" and "channel monitoring" mode or in the off position, as desired, while the microphone is in place in its bracket.

5 Claims, 4 Drawing Figures

U.S. Patent   Apr. 24, 1979   Sheet 1 of 2   4,151,467

SWITCHED MICROPHONE HANG-UP BRACKET

The present invention relates to a hang-up bracket for use with a microphone of the type including an electronic system enable and disable switch.

In present mobile two-way radio communication systems the microphone connected with the radio transceiver has a pushbutton actuated switch which operates the companion radio receiver continuous tone coded squelch system (CTCSS) decoder. When an operator desires to talk via the transmitter portion of the transceiver, he removes the microphone from its hang-up bracket and the microphone's pushbutton switch automatically moves to the extended switch position. In this position the receiver portion of the transceiver is in the normal noise squelch operation, and CTCSS disable condition. This automatically places the receiver in the squelch mode and channel monitoring position so that the operator may be aware of the present use of the channel of interest. When the microphone is returned to its hang-up bracket, means on the bracket returns the pushbutton switch to the CTCSS enable condition for restoring control to the CTCSS decoder. In some instances, it may be desired that the system be activated in the noise squelch mode and channel monitoring condition without the microphone being removed from the hang-up bracket. One prior art system provides a separate control in the companion radio receiver for controlling the state of the squelch mode and channel monitoring condition of the receiver. Other systems have wired in a separate, additional switch to the hang-up bracket. Both of these prior systems require additional wiring and added cost.

Figure 2:
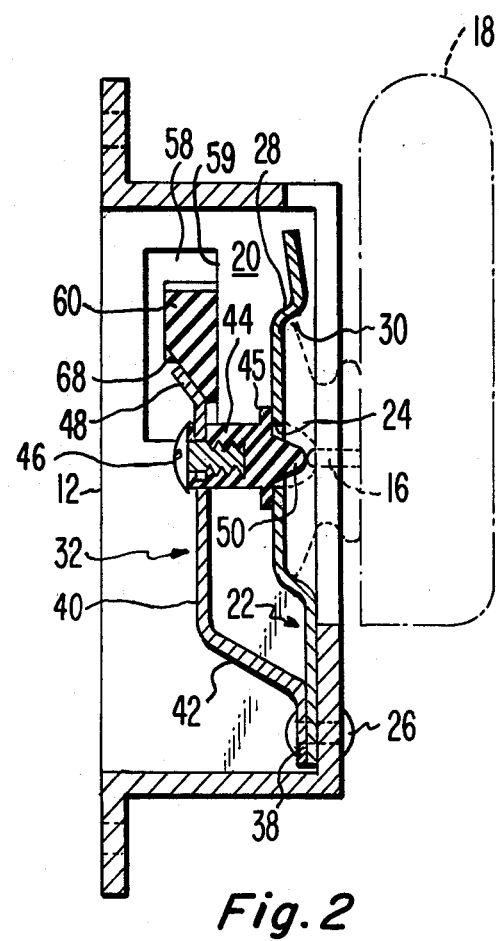
Figure 3:
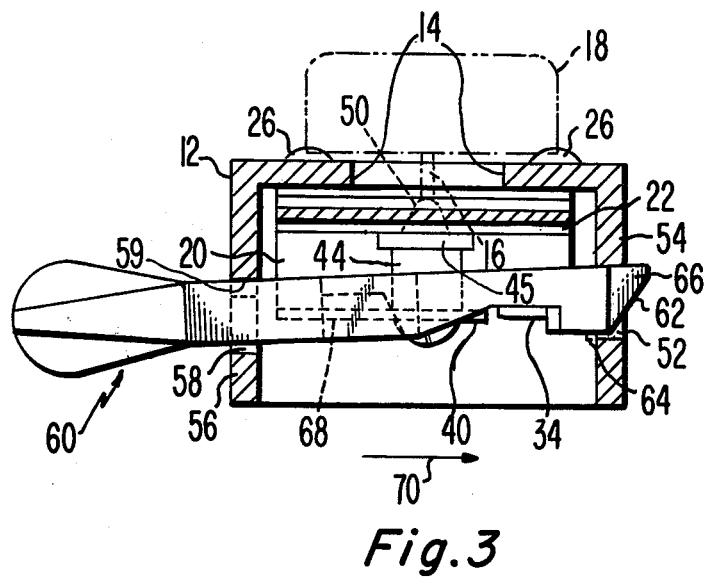
Figure 4:
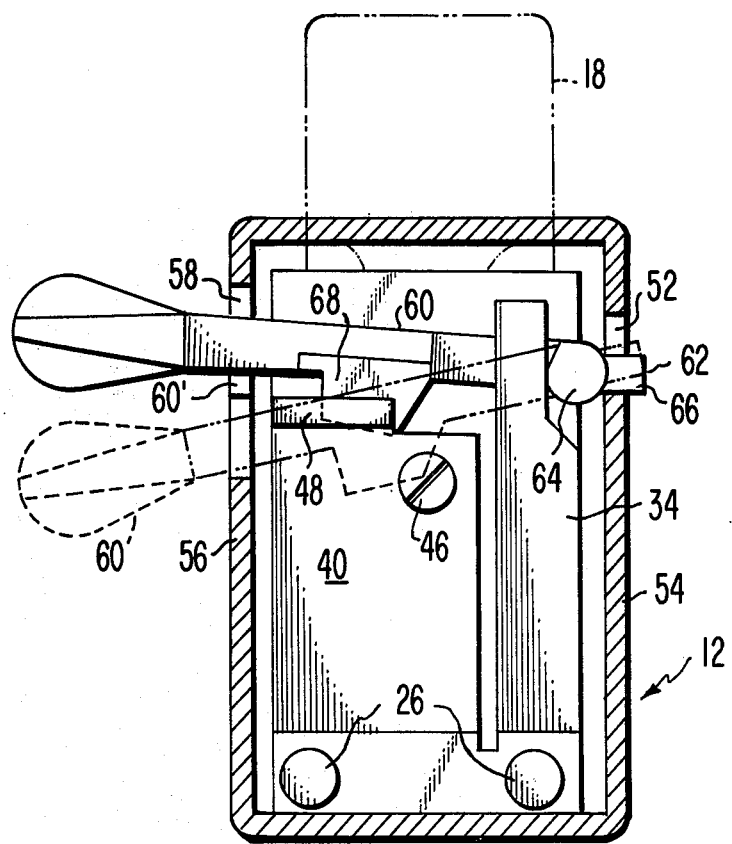

In the drawing:

FIG. 1 is an exploded isometric view of the microphone hang-up bracket embodying the present invention, FIG. 2 is a side sectional view of the bracket of FIG. 1 taken along lines 2—2, FIG. 3 is a plan sectional view of the bracket of FIG. 1 taken along lines 3—3 of FIG. 1, and FIG. 4 is a rear sectional view of the bracket of FIG. 1 taken along lines 4—4.

Referring to the figures, bracket 10 includes a housing 12 having a suitable hang-up clip 14 for receiving a mobile two-way transceiver radio hang-up microphone 18 (shown in phantom in FIG. 2). The microphone 18 is of the type used with mobile two-way radios and has a pushbutton switch 16 (also shown in phantom in FIG. 2) integral therewith which is coupled via wires (not shown) which extend from the microphone to a radio the receiver portion (not shown) of the mobile two-way radio system. Switch 16, when depressed, shuts off the noise squelch in the receiver and enables the channel monitoring system ordinarily referred to as the continuous tone coded squelch system (CTCSS) of the receiver. When the microphone is removed from the bracket, its switch 16 automatically assumes its normally extended position. In this position, the CTCSS decoder is disabled, and the receiver reverts to the noise squelch and channel monitoring mode. The pushbutton switch 16, FIG. 2, extends into the interior of housing 12 when the microphone 18 is clipped to the housing 12. In the position shown, switch 16 is in the desired retracted position.

Bracket 10 includes a channel-shaped spring clip 22 made of thin, resilient spring metal and having a centrally disposed aperture 24. The clip 22 also has a shoulder 28 which resiliently secures the microphone 18 via a corresponding microphone shoulder 30 and is riveted at one end thereof to the housing 12 by rivets 26.

Also secured by rivets 26 is lever locking and switch actuating spring 32. Spring 32 is formed of a thin, resilient spring metal that has a lever locking finger 34 which extends from a lower shoulder 36 depending from bottom flange 38. Locking finger 34 locks camming lever 60 in a manner to be explained. Spring 32 also includes switch activating member 40 depending from bottom flange 38 via shoulder 42. Member 40 and shoulder 42 are spaced from lever locking finger 34 and shoulder 36, respectively. Extending upwardly and in a direction away from shoulder 42 is cam follower 48 bent from member 40. The projection 50 of button 44 faces clip 22. Button 44 is secured by screw 46 to member 40. The purpose of projection 50 is to activate switch 16 of the microphone 18. Shoulder 45 of button 44 abuts clip 22. Projection 50 protrudes through aperture 24 when in the switch 16 engaging position. Member 40 resiliently urges button 44 in this last-mentioned position.

The opposite sidewalls 54 and 56 of the switch housing are formed with pivot aperture 52 and detent aperture 58, respectively. Aperture 58 includes a detent projection 60'.

Cam lever 60 is disposed in apertures 52 and 58 between clip 22 and spring 32. Thus lever 60 pivots at end 62 via projection 66 in aperture 52. Lever 60 includes a projection 64 which is resiliently raced against wall 54 by finger 34 of spring 32, FIG. 3. Finger 34 resiliently urges lever 60 via pivot projection 66 against wall 54. Finger 34 also resilienty urges lever 60 against sidewall 59 of aperture 58. Disposed approximately centrally of lever 60 is a downwardly depending sloping cam 68. Cam 68 engages cam follower 48 of spring 32, FIG. 2. Lever 60 is pivoted via projections 64 and 66 between the positions shown solid and dotted, FIG. 4. Detent projection 60' serves to lock lever 60 in the upper or lower positions, in cooperation with finger 34, FIGS. 1 and 4. Lever 60 of cam 68 is spaced with respect to cam follower 48 so that lever 60 when in the upper position (solid, FIG. 4) permits switch activating projection 50 to engage switch 16, FIG. 2, enabling the CTCSS decoder (not shown). When lever 60 is disengaged from the upper position of aperture 58, FIG. 4, and pivoted to the lower position, shown in phantom, cam 68 forces spring 32 and button 44 away from the switch 16, disengaging projection 50 from switch 16. Means such as a spring (not shown) in microphone 18 automatically closes the switch 16 disabling the corresponding CTCSS decoder circuit.

A suitable sloping cam surface is provided projection 64 end 66 to permit the lever 60 to be inserted in the direction 70, FIG. 3, through aperture 58 between clip 22 and spring 32 into locking engagement with finger 34 and into engagement with aperture 52.

What is claimed is:

1. A microphone hang-up bracket for use with a microphone and related electronic system, the microphone including a switch normally biased to a first position and which can be placed in a second position, said switch enabling and disabling said system, said bracket comprising:

a body adapted to receive and releasably secure said microphone thereto, and means connected to said body capable of assuming two actuating positions, which when in one of these two actuating positions with said microphone secured to said body, engages said switch and places it in its second position, and when in the other of its two actuating positions, with said microphone secured to said body, does not engage said switch, whereby said switch assumes its first position.

2. The bracket of claim 1, wherein said means includes:

lever means mounted to said body movable between first and second positions for engaging said switch when said lever means is in said first actuating position and for being disengaged from said switch when in said second actuating position and detent means associated with said lever means for holding said lever means in either of its first and second actuating positions.

3. The bracket of claim 2 wherein said lever means includes a cantilevered spring member secured to said body and including switch operating means connected thereto and an elongated lever pivotally mounted to said body and having a cam surface in engagement with said spring member for camming said spring member to said first and second actuating positions.

4. A microphone hang-up bracket for use in a two-way radio system for releasably securing a microphone of the type including a push-button switch normally extended when said microphone is disconnected from said bracket, said switch enabling and disabling a tone coded squelch system in the receiver portion of said two-way radio system in accordance with the switch condition thereof, said bracket comprising:

a housing adapted to receive said microphone, a first flat spring-like member coupled to said housing and positioned with respect to said microphone for when mounted in said body to releasably secure said microphone in said housing, said first spring-like member having an opening therein aligned with said push-button when said microphone is secured in said housing to allow said push-button to be extended, manual switch enabling and disabling means mounted to said housing including a second spring member and switch activating means secured to said spring member for manually selectively placing said push-button switch in the enabling or disabling position when said microphone is secured to said bracket, said second spring member having first and second positions manually selected positions, said switch activating means extending through said opening in said first spring member to engage said push-button switch when said second spring member is in one of said first and second positions and when in the other of said first and second positions for allowing said push-button switch to extend to its normally extended position.

5. The bracket of claim 4, wherein said switch enabling and disabling means includes cam means pivotally mounted to said housing for camming said second spring member.

* * * * *

UNITED STATES PATENT AND TRADEMARK OFFICE
CERTIFICATE OF CORRECTION

PATENT NO. : 4,151,467
DATED : April 24, 1979
INVENTOR(S) : Robert M. Kongelka et al It is certified that error appears in the above-identified patent and that said Letters Patent is hereby corrected as shown below:

Column 2, line 6, that portion reading "52" should read -- 32 --; line 31, that portion reading "raced" should read -- braced --; line 34, that portion reading "resilienty" should read -- resiliently --; Column 3, line 11, that portion reading "second positions" should read -- second actuating positions --.

Signed and Sealed this

Thirty-first Day of July 1979

[SEAL]

Attest:

LUTRELLE F. PARKER
Attesting Officer
Acting Commissioner of Patents and Trademarks